United States Patent Office 3,585,217
Patented June 15, 1971

3,585,217
PRODUCTION OF ETHYLENE OXIDE
Eckart Titzenthaler, Oberhausen, Germany, assignor to Badische Anilin- & Soda-Fabrik Aktiengesellschaft, Ludwigshafen (Rhine), Germany
No Drawing. Filed Oct. 4, 1967, Ser. No. 672,695
Claims priority, application Germany, Oct. 6, 1966, P 12 79 007.7–42
Int. Cl. C07d 1/14
U.S. Cl. 260—348.5           9 Claims

ABSTRACT OF THE DISCLOSURE

Production of ethylene oxide by reaction of ethylene with oxygen or gases containing oxygen at temperatures of 150° to 400° C. in the presence of silver silicate as catalyst. Glycol and polyethylene oxides may be prepared from ethylene oxide.

---

This invention relates to an improved process for the production of ethylene oxide.

In a commercial process for the production of ethylene ethylene is oxidized with gases containing oxygen in the presence of silver as a catalyst. It is known from U.S. patent specification No. 2,562,857 and from U.S. patent specifications Nos. 2,837,424 and 2,837,486 that suitable catalysts are obtained by removing alkaline earth metals from alloys of silver with alkaline earth metals, leaving only a small residue of the alkaline earth metals. Catalysts prepared by this method do not have very good activity or selectivity. Silver catalysts having improved activity are obtained by applying reduced silver compounds to inert carrier materials followed by reduction. Carrier materials include clay, alumina, mullite, silicon carbide or beryllium porcelains (U. K. patent specification No. 711,601), spinels (U.S. patent specifications Nos. 2,713,586, 2,593,100 and 2,593,097), magnetite (U.S. patent specification No. 2,593,156), graphite (U.S. patent specification No. 2,615,-899) or silicon dioxide (U.S. patent specification No. 2,430,443). Finely divided silver has only poor adhesion to the carrier, however, and this is a disadvantage especially when the catalysts are used in a fluidized bed. Moreover these catalysts tend to agglomerate during the reaction. The activity of the catalysts can be increased by additives. The following have been described as suitable additives: alkaline earth metal oxides, alkaline earth metal carbonates or salts of alkaline earth metals with lower fatty acids (U.S. patent specifications Nos. 2,628,965 and 2,593,099), and metal halides (U.S. patent specifications Nos. 2,615,900 and 2,799,687). The catalysts provided with the said additives also tend to agglomerate in a fluidized bed.

Furthermore it has been stated in Japanese patent specification No. 18,662/63 that silver silicate, silver fluosilicate or silver heteropolysilicates are suitable catalysts. They are however only used in combination with other catalysts, such as silver titanate in the liquid phase with the use of a solvent. The production of the mixed catalysts and operation in the liquid phase is expensive.

With all the abovementioned catalysts, specific yields of less than 1000 g. of ethylene oxide per kilogram of silver per hour are obtained.

It is an object of the present invention to provide a process which gives high specific yields of ethylene oxide. Another object of the invention is to provide a process for the production of ethylene oxide in which the catalyst used has high resistance to abrasion and a low tendency to agglomerate.

In accordance with this invention these and other objects and advantages are achieved in an improved process for the production of ethylene oxide by reacting ethylene with oxygen or gases containing oxygen at temperatures of 150° to 400° C. and pressures between atmospheric pressure and 30 atmospheres in the presence of catalysts containing silver, wherein the improvements comprises using as catalyst silver silicate having a silver content of 30 to 90% by weight based on silver silicate.

The new process has the advantage that in addition to a long life, a much higher specific yield of ethylene oxide is obtained than hitherto. Moreover the new catalyst has a high abrasion resistance and only a slight tendency to agglomerate and this is an advantage particularly when using a fluidized bed. Furthermore the catalyst is easy to prepare.

Ethylene is used as the starting material. It is also possible to use gases containing ethylene. The gas advantageously contains more than 0.5% by volume of ethylene. Inert gases, for example carbon dioxide, nitrogen, water vapor or small amounts of saturated hydrocarbons may be contained in the gas in addition to ethylene. To suppress the formation of carbon dioxide, the reaction may be carried out in known manner in the presence of for example 0.01 to 10 p.p.m. of compounds containing halogen, for example in the presence of chlorohydrocarbons, such as ethylene chloride, or chlorinated phenols. The compounds containing halogen may be supplied for example by means of inert gases.

The reaction is carried out with oxygen or a gas containing oxygen. When oxygen-containing gases are used, these generally contain 10 to 30% by volume of oxygen, preferably 15 to 25% by volume of oxygen. It is preferred to use air. It is also possible however to use gases having a higher oxygen content.

Ethylene and oxygen (or ethylene and oxygen-containing gas) are in general used so that the mixture is outside the explosive limits. The explosive limits may be determined by known methods for each gas mixture. It is advantageous to use oxygen in excess, for example up to 50 mole percent, with reference to ethylene. The reaction is carried out in the gas phase in general at temperatures of 150° to 400° C., preferably 170° to 350° C.

The reaction may be carried out at atmospheric pressure, slightly subatmospheric pressure or slightly superatmospheric pressure, for example up to 2 atmospheres. In commercial operation it is preferred to use pressures of up to 30 atmospheres.

The silver catalysts advantageously contain 30 to 90% by weight, preferably 45 to 85% by weight, of silver. The silver catalysts may also contain prior art activators, such as compounds of Group I, II or III of the Periodic System, for example oxides, carbonates, hydroxides or salts with lower fatty acids. Halogen compounds, such as alkali metal chlorides, which are known to counteract the formation of carbon dioxide, may be incorporated into the catalysts. The silver silicates may be used unsupported (i.e. without carrier). In this case the silver silicate is advantageously prepared by reaction of an alkali metal silicate solution, for example waterglass, with solutions of silver salts, such as silver nitrate, followed by drying of the precipitate at 100° to 120° C.

It is preferred to use silver polysilicates in which there are about three silicon atoms to two silver atoms. It is also possible however to use silver orthosilicate which may be obtained for example by a process described in Zeitschrift für anorganische und allgemeine Chemie, 318, 72 to 88 (1962), by reaction of silver oxide with pure precipitated silicic acid in equivalent proportions followed by treatment with a silver nitrate melt at 280° C.

It is also possible to apply the silver silicates in a moist condition to the carrier, such as fuller's earth, pelleted silicic acid, aluminum oxide or silicates and to heat the product for example at 100° to 110° C.

The finished supported catalysts in general contain 5 to 20% by weight of silver. In a suitable particle size, silver silicates are suitable for reaction in a fluidized bed, preferably without a carrier. The catalyst may be rapidly brought into its active form by treatment with hydrogen prior to the reaction.

The process according to the invention may be carried out for example by arranging silver silicate having the said composition (which may have been applied to a carrier) stationarily in a tube and passing ethylene and oxygen in the stated proportions or a gas containing ethylene and oxygen through the tube at the stated temperatures and pressures. The ethylene and the oxygen or oxygen-containing gas may be metered separately into the reaction chamber or may be previously mixed. In another preferred embodiment ethylene and oxygen or a gas mixture containing ethylene and oxygen are passed at the said temperatures through a fluidized bed of silver silicate particles. Undesirable formation of carbon dioxide may be lessened by adding inert gases which may contain halogen compounds. The ethylene oxide is separated from the gas mixture obtained, for example by washing with water. After the ethylene oxide has accumulated in water it is isolated by distillation. The residual gas may be recycled to the reaction after it has been enriched with ethylene and oxygen.

The invention is illustrated further by the following examples in which the parts specified are parts by weight unless stated otherwise. Parts by weight bear the same relation to parts by volume as the kilogram to the liter.

EXAMPLE 1

A boiling solution of 170 parts of 35% by weight waterglass (Deutsches Arzneibuch (DAB) 6) and 1000 parts by volume of water is allowed to flow into a boiling solution of 100 parts of silver nitrate and 1000 parts by volume of water while stirring. The precipitate is isolated by filtration and washed with hot water until it is free from nitrate ions. The filter cake is then dried at 110° C. until its weight is constant. The silver content is about 48% by weight. The silver silicate obtained is then broken up and a fracton having a particle size of 0.15 to 0.3 mm. is screened out. This screen fraction is heated for three hours at 400° C. prior to use.

A vertical tube having a capacity of 1900 parts by volume, closed at the bottom by a porous gas-permeable plate, is charged with 57 parts of the silver silicate particles, and 2,200,000 parts by volume (S.T.P.) of a preheated gas mixture consisting of 5.5% by volume of ethylene, 0.015% by volume of ethane, 7% by volume of carbon dioxide, 6.3% by volume of oxygen, 0.1 p.p.m. of ethylene chloride and the remainder nitrogen is introduced per hour into the bottom of the tube through the porous plate. The fluidized silver silicate bed is heated up to 300° C. in the course of several days and kept at this temperature. The effluent gas contains 0.75% by volume of ethylene oxide. This is equivalent to a yield per hour of 330 g. of ethylene oxide per liter of catalyst or 1190 g. of ethylene oxide per kilogram of silver.

EXAMPLE 2

Silver silicate is prepared as described in Example 1 and mixed while in the moist condition with 0.143 part of boric acid and which is dissolved in 50 parts by volume of water. The catalyst composition is then dried for one day at 125° C. The dried catalyst is broken up and the screen fraction from 0.15 to 0.3 mm. is activated at 400° C. The catalyst contains 49.1% by weight of silver and 0.02% by weight of boron.

55 parts of the catalyst is placed in the apparatus described in Example 1 and 2,200,000 parts by volume (S.T.P.) per hour of the gas mixture described in Example 1 is introduced at the bottom. As soon as the temperature of 290° C. has been exceeded, 10,000 parts by volume (S.T.P.) of nitrogen which contains 200 p.p.m. of ethylene chloride is added per hour to the gas mixture. When a temperature of 290° to 298° C. is used, the effluent gas contains 0.98% by volume of ethylene oxide. The yield is 432 g. per hour of ethylene oxide per liter of catalyst or 1650 g. of ethylene oxide per kilogram of silver used per hour.

When the experiment is carried out at 300° to 308° C., the effluent gas contains 1.10% by volume of ethylene oxide and the hourly yield is 475 g. of ethylene oxide per liter of catalyst or 1400 g. of ethylene oxide per kilogram of silver used.

EXAMPLE 3

A boiling solution of 304 parts of potassium waterglass (28° to 29° Bé., consisting of 8.19% by weight of potassium oxide and 21.02% by weight of silicon dioxide) and 1000 parts by volume of water is allowed to flow into a boiling solution of 100 parts of silver nitrate and 1000 parts by volume of water while stirring. The precipitate is isolated by filtration and washed with hot water until it is free from nitrate ions. The filter cake is then dried at 125° C. until it has a constant weight and then annealed for three hours at 400° C. The silver silicate has a silver content of 46.0% by weight. It is broken up and a fraction from 0.2 to 0.3 mm. in diameter is screened out.

A vertical tube having a capacity of 2400 parts by volume and closed at the bottom by a porous gas-permeable plate is charged with 78 parts of the silver silicate particles. 6,380,000 parts by volume (S.T.P.) of a gas mixture consisting of 5.6% by volume of ethylene, 0.01% by volume of ethane, 6.9% by volume of carbon dioxide, 6.4% by volume of oxygen, 0.1 p.p.m. of ethylene chloride and the remainder nitrogen is passed in per hour through the porous plate. Part of the gas mixture is preheated to 270° to 300° C. to keep the catalyst layer at a temperature of 180° C. The fluidized layer of silver silicate is heated to 260° C. in the course of several days and kept at this temperature. A pressure of 6 atmospheres is maintained in the reaction tube. The pressure is released and the product cooled. The effluent gas contains 0.65% by volume of ethylene oxide. This is equivalent to a yield of 679 g. of ethylene oxide per liter of catalyst or 2270 g. of ethylene oxide per kg. of silver used.

I claim:

1. A process for the production of ethylene oxide by reaction of ethylene with oxygen or gases containing oxygen at temperatures of from 150° to 400° C. and at pressures of from atmospheric pressure to 30 atmospheres in the presence of catalysts containing silver in the gas phase wherein the improvement comprises using a silver polysilicate having about three silicon atoms to two silver atoms as the catalyst.

2. A process as claimed in claim 1 wherein the gas used contains more than 0.5% by volume of ethylene.

3. A process as claimed in claim 1 wherein a compound containing halogen is used as an inhibitor.

4. A process as claimed in claim 1 wherein an oxygen-containing gas is used which contains 10 to 30% by volume of oxygen.

5. A process as claimed in claim 1 in which air is used as the oxygen-containing gas.

6. A process as claimed in claim 1 in which oxygen is present in an excess of up to 50 mole percent with reference to ethylene.

7. A process as claimed in claim 1 carried out at from 170° to 350° C.

8. A process as claimed in claim 1 wherein the catalyst used is a silver silicate having a silver content of 40 to 85% by weight.

9. A process as claimed in claim 1 carried out in a fluidized bed.

(References on following page)

References Cited

FOREIGN PATENTS

| | | | | |
|---|---|---|---|---|
| 38/18,662 | 9/1963 | Japan | | 260—348.5 |
| 560,782 | 7/1958 | Canada | | 260—348.5 |
| 1,259,574 | 3/1961 | France | | 260—348.5 |
| 676,358 | 7/1952 | Great Britain | | 260—348.5 |
| 892,381 | 3/1962 | Great Britain | | 260—348.5 |
| 527,261 | 7/1956 | Canada | | 260—348.5 |

NORMA S. MILESTONE, Primary Examiner

U.S. Cl. X.R.

252—454, 432